(12) United States Patent
Mitani et al.

(10) Patent No.: US 8,059,971 B2
(45) Date of Patent: Nov. 15, 2011

(54) OPTICAL RECEPTION DEVICE

(75) Inventors: Shunsuke Mitani, Tokyo (JP);
Kazuyuki Ishida, Tokyo (JP);
Katsuhiro Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 938 days.

(21) Appl. No.: 11/792,306

(22) PCT Filed: Dec. 28, 2004

(86) PCT No.: PCT/JP2004/019609
§ 371 (c)(1),
(2), (4) Date: Jun. 5, 2007

(87) PCT Pub. No.: WO2006/070456
PCT Pub. Date: Jul. 6, 2006

(65) Prior Publication Data
US 2008/0175602 A1    Jul. 24, 2008

(51) Int. Cl.
*H04B 10/00* (2006.01)
*H04B 10/06* (2006.01)
*H04B 10/04* (2006.01)

(52) U.S. Cl. ......... 398/202; 398/203; 398/204; 398/213

(58) Field of Classification Search ........... 398/202–214
See application file for complete search history.

(56) References Cited

U.S. PATENT DOCUMENTS

| 6,236,488 | B1 | 5/2001 | Shimizu et al. | |
|---|---|---|---|---|
| 6,469,817 | B1* | 10/2002 | Heflinger | 398/202 |
| 2001/0009469 | A1* | 7/2001 | Shimizu et al. | 359/187 |
| 2002/0001116 | A1* | 1/2002 | Kajiya et al. | 359/187 |
| 2002/0159668 | A1* | 10/2002 | Williams et al. | 385/3 |
| 2005/0111854 | A1* | 5/2005 | Miyazaki | 398/188 |
| 2006/0045539 | A1* | 3/2006 | Jennen | 398/161 |
| 2007/0058988 | A1 | 3/2007 | Yonenaga | |

FOREIGN PATENT DOCUMENTS

| FR | 2 761 490 A1 | 10/1998 |
|---|---|---|
| JP | 5-268162 A | 10/1993 |
| JP | 6-21891 A | 1/1994 |
| JP | 2003-309520 A | 10/2003 |
| JP | 2004-37647 A | 2/2004 |
| WO | WO-2005/088876 A1 | 9/2005 |

OTHER PUBLICATIONS

Zhu [B. Zhu et al., "High Spectral Density Long-Haul 40-Gb/s Transmission Using CSRZ-DPSK Format", J. of Lightwave Technology, vol. 22, pp. 208-214, Jan. 2004.* Swanson ["High Sensitivity Optically Preamplified Direct Detection DPSK Receiver With Active Delay Line Stabilization" IEEE Photonics Technology Letters vol. 6. No. 2. Feb. 1994].*
Milivojevic et al., "Practical 40GBIT/S CSRZ-DPSK Transmission System with Signed Online Chromatic Dispersion Detection," ECOC2003, TU364.
Swanson et al., "High Sensitivity Optically Preamplified Direct Detection DPSK Receiver with Delay-Line Stabilization," IEEE Photonics Technology Letters, vol. 6, No. 2, Feb 1994, pp. 263-265.

\* cited by examiner

*Primary Examiner* — Shi K Li
*Assistant Examiner* — Oommen Jacob
(74) *Attorney, Agent, or Firm* — Birch, Stewart, Kolasch & Birch, LLP

(57) ABSTRACT

An optical reception device realizes stabilization of reception sensitivity inexpensively and highly precisely. The optical reception device includes: a Mach-Zehnder type 1-bit delay unit including a one-terminal input port and two-terminal output ports for decoding an optical difference phase shift keying (DPSK) signal and provided with one or more phase control functions to control the phase state of light; photoelectric conversion means for branching a portion of an optical output signal output from the one-side output port of the Mach-Zehnder type 1-bit delay unit, to convert the branched portion into an electric signal; and a phase control unit for controlling the phase state of the Mach-Zehnder type 1-bit delay device by using as an error signal the output signal of the photoelectric conversion means.

7 Claims, 16 Drawing Sheets

OPTICAL RECEPTION DEVICE

TECHNICAL FIELD

The present invention relates to an optical reception device, and more particularly, to an optical reception device using an optical decoder of a Mach-Zehnder (MZ) type.

BACKGROUND ART

In a conventional optical communication system, for example, information transmission using a modulation system that utilizes light intensity, such as an OOK (On-Off Keying) system, is performed.

On the other hand, along with the recent realization of a high speed optical communication system and reduction in its cost, a differential phase shift keying (DPSK) system using optical phase information is attracting attention, because of being excellent in non-linear durability and being expected as having an effect of improving the sensitivity to about twice (3 dB) as compared with the OOK system.

For decoding an optical signal transmitted in accordance with the DPSK system, an optical decoder using, for example, a 1-bit delay unit (hereinafter, referred to as "MZ-type 1-bit delay unit") of the Mach-Zehnder (MZ) type is used. The MZ-type 1-bit delay unit decodes an optical signal transmitted using the electrooptical effect of a dielectric waveguide formed of lithium niobate (LiNbO3) or the like.

In the MZ-type 1-bit delay unit, in a case where a phase difference between continuous bits is 0, an optical signal is output to one port called a constructive port, and in a case where the phase difference is $\pi$, an optical signal is output to the other port called a destructive port. Optical outputs from both the ports are received differentially at an optical receiver called a balanced receiver. Thus, in the optical reception device having an MZ-type 1-bit delay unit, differential reception using the balanced receiver is used, whereby the reception sensitivity is enhanced.

However, in a case where the phase of the MZ-type 1-bit delay unit or the wavelength of an input optical signal vary due to a change in environment such as temperature, the reception sensitivity is degraded. Thus, there is a conventional problem of stabilizing the reception sensitivity even in the case where the environment such as temperature varies.

As a prior art for solving the above-mentioned problem, a process for stabilizing the phase of the MZ-type 1-bit delay unit is proposed, which performs control so that a bit rate frequency component of an optical signal received differentially at the balanced receiver becomes maximum (e.g., see Non-Patent Document 1).

The light reception device shown in Non-Patent Document 1 is composed of a DPSK receiver including a 1-bit delay unit, a balanced receiver, and the like, and a control system including an RF power branching unit, an RF power detector, a phase control circuit, and the like. A part of a high-speed electric signal immediately after the balanced receiver is branched at the RF power branching unit so that the RF power thereof is measured by the RF power detector. As a result, in the optical reception device, a phase control function of the Mach-Zehnder type 1-bit delay unit is controlled so that the measured RF power becomes maximum, whereby the reception sensitivity is stabilized.

Further, as one of the other processes, a process for stabilizing the phase of the MZ-type 1-bit delay unit that controls a phase based on a DC current flowing through the balanced receiver is also proposed (e.g., see Non-Patent Document 2).

A reception device of an optical transmission system shown in Non-Patent Document 2 is composed of a DPSK receiver including a 1-bit delay unit, a balanced receiver, and the like, and a control system including a DC current detector, a phase control circuit, and the like. A DC current component of the balanced receiver is detected by a DC current detector, and a phase adjusting function provided in the Mach-Zehnder type 1-bit delay unit is controlled based on the detected DC current value, whereby the reception sensitivity is stabilized.

Non-Patent Document 1: Biljana Milivojevic et al, "Practical 40 Gbit/s CSRZ-DPSK transmission system with signed online chromatic dispersion detection" ECOC2003, TU364

Non Patent Document 2: Eric A. Swanson et al, "High Sensitivity Optically Preamplified Direct DitecOtion DPSK Receiver with Active Delay-Line Stabilization" Photonics technology letters, vol. 6, 1994

DISCLOSURE OF INVENTION

Problem to be Solved by the Invention

However, in the prior art shown in Non-Patent Document 1, there is a problem in that expensive RF equipment such as an RF power branching unit and an RF power detector are required.

On the other hand, in the prior art shown in Non-Patent Document 2, there is a problem in that, since control is performed based on the DC current of the balanced receiver, the quality of an error signal required for the control is not sufficient.

Specifically, in a conventional optical reception device, it is difficult to satisfy both the reduction in cost of the device and the control precision for stabilizing an optical output.

The present invention has been made to solve the above-mentioned problems, and an object of the present invention is to obtain an optical reception device, which can be produced at low cost, and is capable of stabilizing the fluctuation in reception sensitivity caused by the change in phase of the MZ-type 1-bit delay unit and the change in wavelength of an input optical signal.

Means for Solving the Problems

An optical reception device according to the present invention includes: a Mach-Zehnder type 1-bit delay unit having one or a plurality of phase control functions of controlling a phase state of light; photoelectric conversion means for branching a part of an optical output signal output from a one-side output port of the Mach-Zehnder type 1-bit delay unit and converting it into an electric signal; and a phase control unit for controlling a phase state of the Mach-Zehnder type 1-bit delay unit by using as an error signal an output signal of the photoelectric conversion means.

Effects of the Invention

The optical reception device according to the present invention controls stabilization based on an output of optical/electric conversion means, so the optical reception device exhibits the effect of being able to realize the stabilization of reception sensitivity at low cost with high precision.

BEST MODE FOR CARRYING OUT THE INVENTION

Hereinafter, Embodiments 1 to 5 of an optical reception device of the present invention will be described in detail with reference to the drawings. The present invention is not limited to Embodiments 1 to 5.

Embodiment 1

Figure 1:
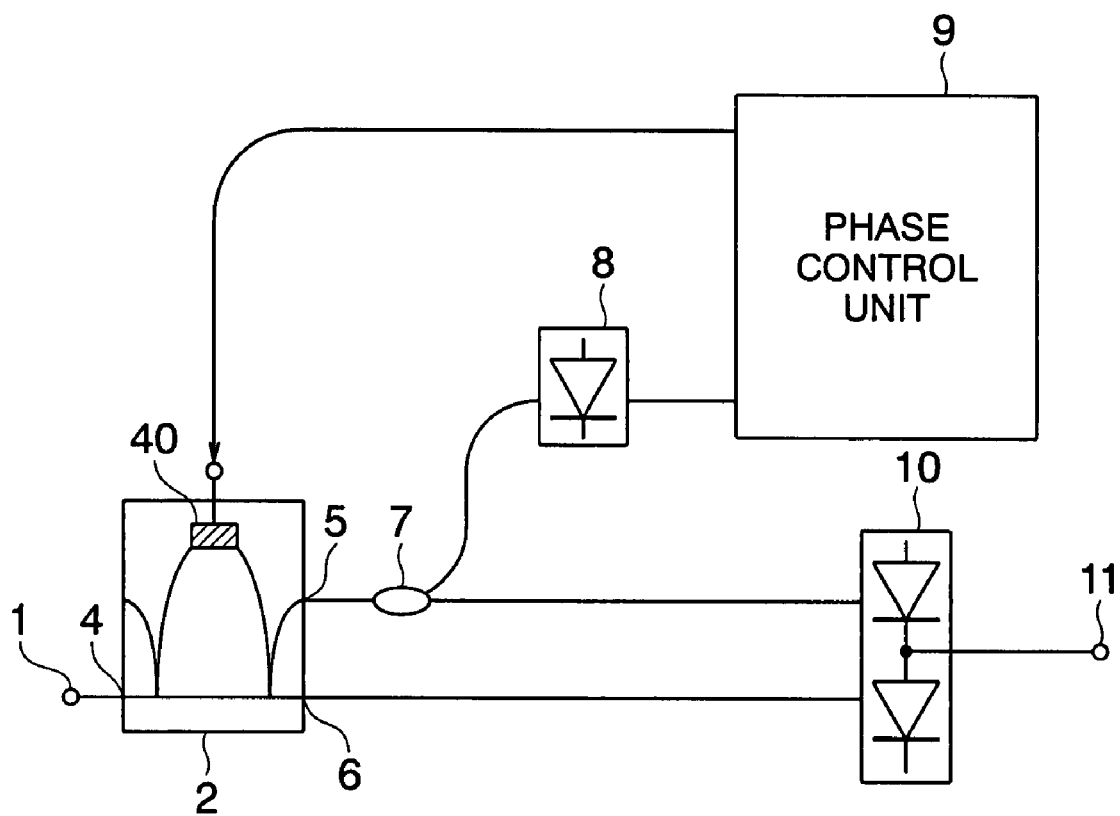
FIG. 1 is a block diagram showing a configuration of an optical reception device according to Embodiment 1 of the present invention.

FIG. 1 is a block diagram showing a configuration of an optical reception device according to Embodiment 1 of the present invention. The optical reception device shown in the figure includes a reception system (DPSK receiver) and a control system. The reception system includes an optical input signal terminal 1, one-terminal input port 4, and two-terminal output ports 5 and 6, and is configured so as to include, for example, an MZ-type 1-bit delay unit 2 for decoding a DPSK signal or the like, a balanced receiver 10 for differentially receiving an optical signal output from the two-terminal output ports 5 and 6, and an electric output terminal 11. Further, the control system is configured so as to include an optical coupler 7 for branching a part of an optical signal, a PD (Photo Diode) 8 as photoelectric conversion means, and a phase control unit 9 for outputting a phase control signal for controlling the phase of the MZ-type 1-bit delay unit 2.

The MZ-type 1-bit delay unit 2 has one or a plurality of phase control functions 40 as an object to be controlled by the phase control unit 9. Regarding the phase control function 40, for example, electrodes (RF electrode, DC electrode) provided in the MZ-type 1-bit delay unit 2 and an optical waveguide realize the functions thereof. For example, the refractive index of an optical waveguide can be changed based on a voltage applied to the electrodes, and the phase of an optical reception signal can be controlled based on the change in the refractive index.

Next, the operation of the optical reception device shown in FIG. 1 will be described. In the figure, an optical signal output from the output port 5 of the MZ-type 1-bit delay unit 2 is partially branched by the optical coupler 7, and is converted into an electric signal by the PD 8. The electric signal converted by the PD 8 is input to the phase control unit 9 for processing, and is applied to the phase control function 40 of the MZ-type 1-bit delay unit 2 as a control signal. As described later, a case where the power of the electric signal becomes maximum corresponds to an optimum operation point of the MZ-type 1-bit delay unit 2 with respect to the input optical signal, and by performing feedback control so that the electric signal becomes a maximum value, the stabilization control of the reception sensitivity can be performed.

Note that in FIG. 1, a part of the optical signal of the output port 5 is branched by the optical coupler 7. However, the optical output of the output port 6 of the MZ-type 1-bit delay unit 2 may be branched. Even in the case of this configuration, the stabilization control of the reception sensitivity can be performed by the feedback control using an electric signal subjected to photoelectric conversion.

Figure 2:
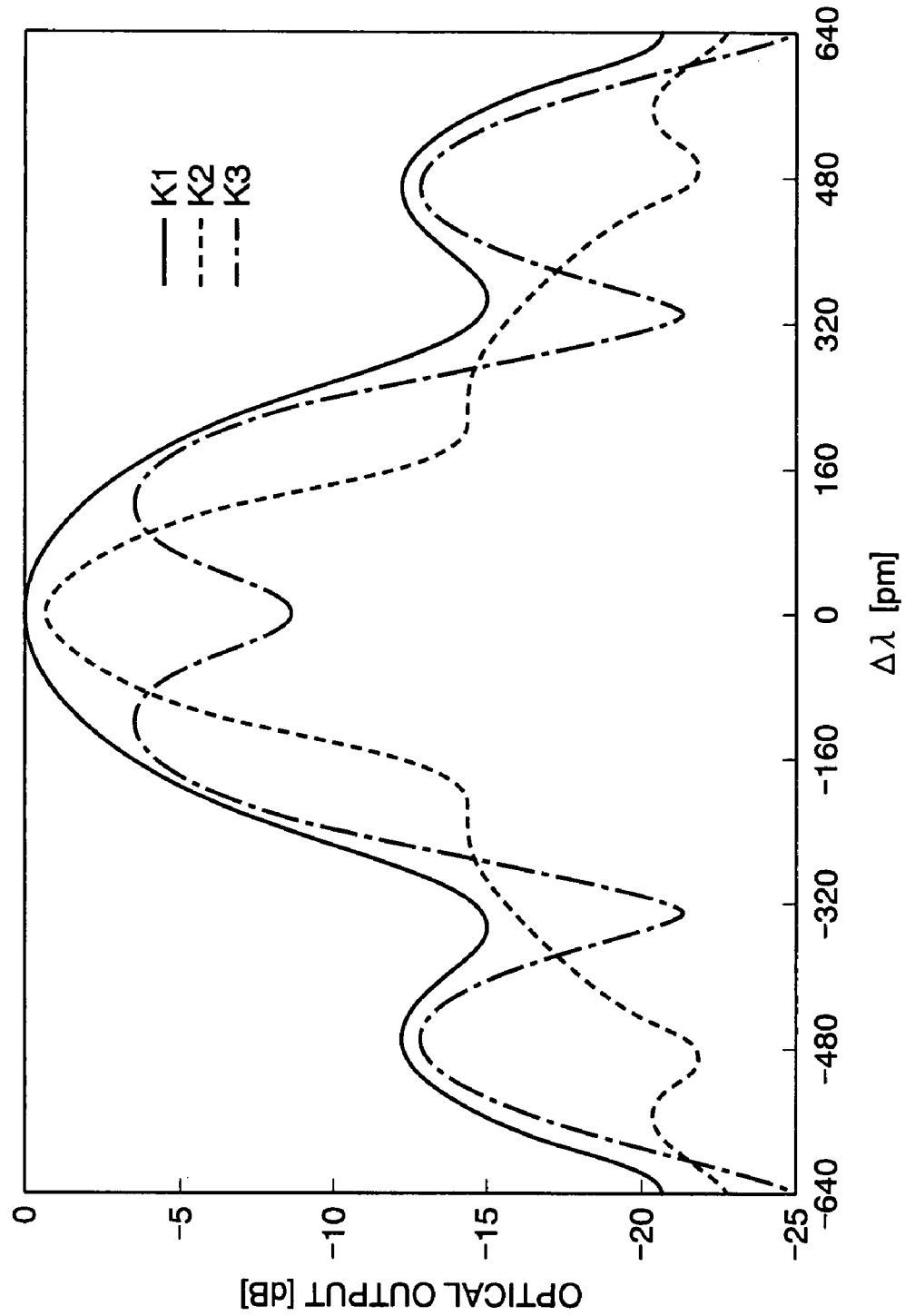
FIG. 2 is a view showing optical output characteristics with respect to a wavelength shift of an optical DPSK signal input to an input port of an MZ-type 1-bit delay unit of the optical reception device according to Embodiment 1 of the present invention and an optical signal output from an output port thereof.

FIG. 2 is a diagram showing optical output characteristics with respect to a wavelength shift of an optical DPSK signal input to the input port 4 of the MZ-type 1-bit delay unit 2 and an optical signal output from the output ports 5 and 6. In the figure, a curve K1 indicated by the solid line represents an optical spectrum of the DPSK signal input to the MZ-type 1-bit delay unit 2, a curve K2 indicated by the wavy line represents a spectrum of an optical signal output from the output port 5 (constructive port) of the MZ-type 1-bit delay unit 2, and a curve K3 indicated by the alternate long and short dash line represents a spectrum of an optical signal output from the output port 6 (destructive port) of the MZ-type 1-bit delay unit 2.

Figure 3:
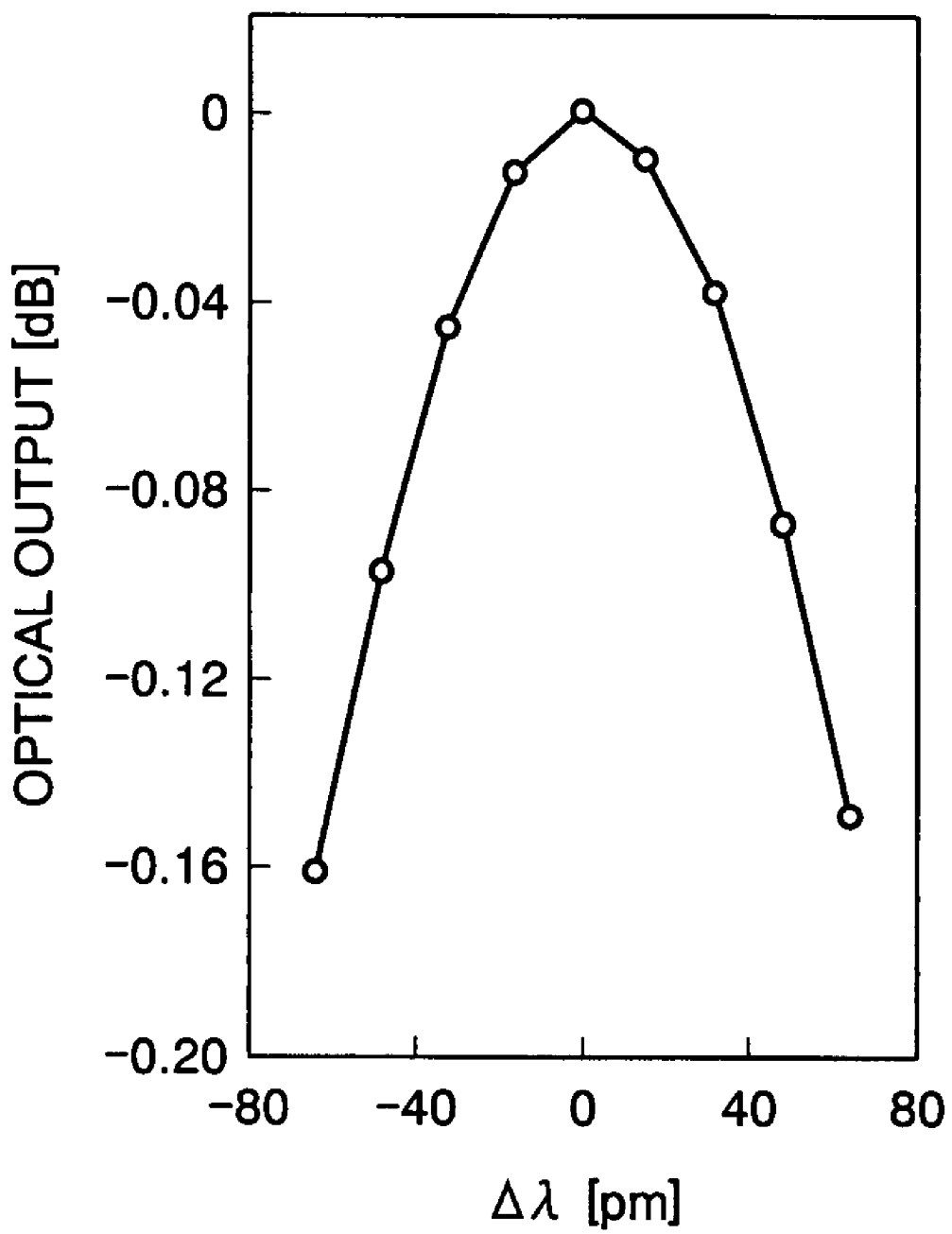
FIG. 3 is an enlarged view of a spectrum in the vicinity of a center wavelength (Δλ=0) in output characteristics of an output port 5 shown in FIG. 2.
Figure 4:
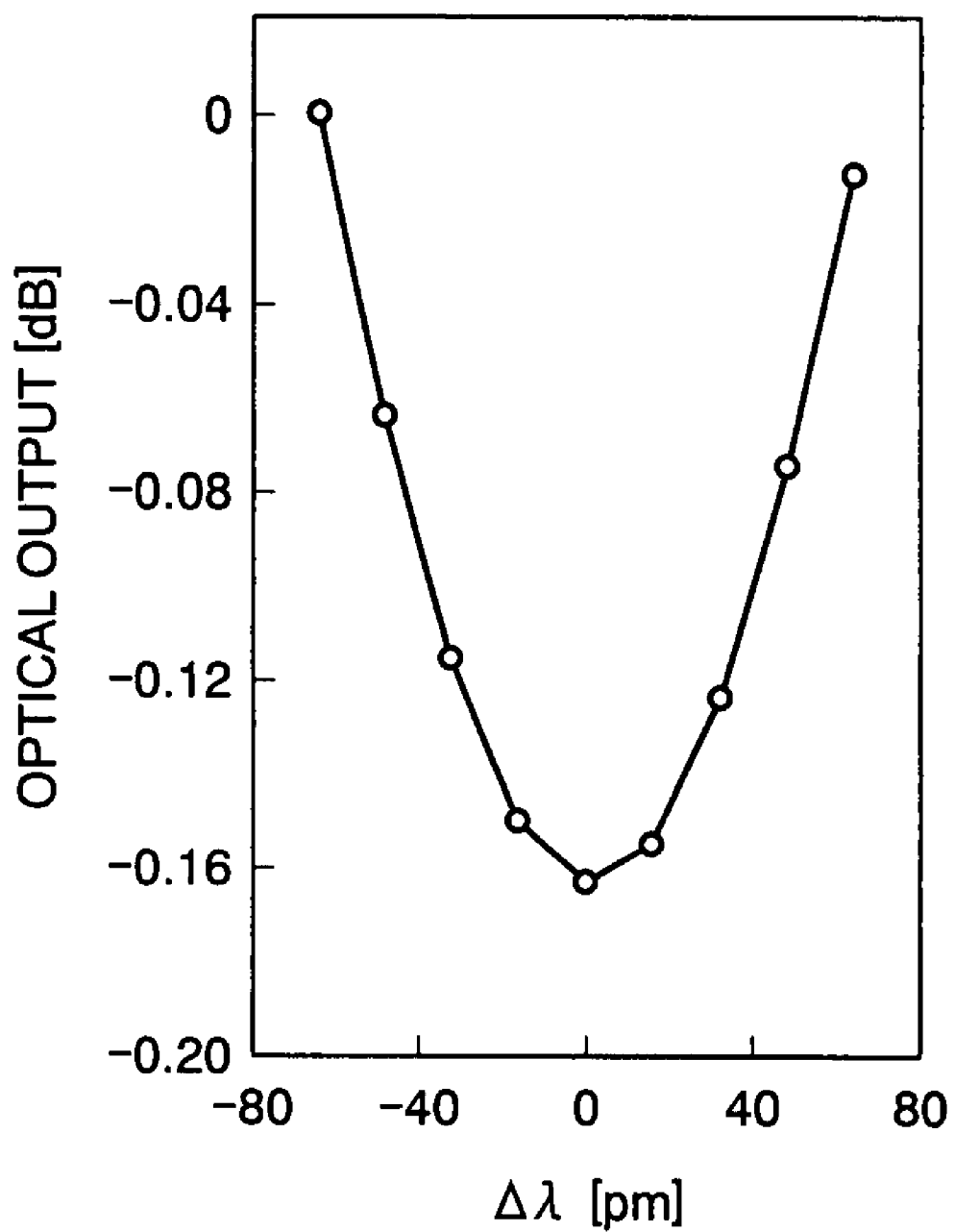
FIG. 4 is an enlarged view of a spectrum in the vicinity of a center wavelength (Δλ=0) in output characteristics of an output port 6 shown in FIG. 2.

Further, FIGS. 3 and 4 are enlarged views of a spectrum in the vicinity of a center wavelength (Δλ=0) in each output characteristic of the output ports 5 and 6 shown in FIG. 2. For example, FIG. 3 shows a spectrum of the output port 5 (constructive port), and FIG. 4 shows a spectrum of the output portion 6 (destructive port). Both the graphs of FIGS. 3 and 4 are normalized with each maximum value.

Next, an output stabilization control of the MZ-type 1-bit delay unit 2 in the optical reception device shown in FIG. 1 will be described with reference to FIGS. 3 and 4. As shown in FIG. 3, the wavelength to be $\Delta\lambda=0$ provides a local maximum value, which becomes an optimum operation point of the phase control of the MZ-type 1-bit delay unit 2 with respect to an input optical signal. Specifically, regarding the optical signal output from the output port 5, the maximum value of the optical output characteristics with respect to a wavelength shift is controlled, whereby the reception sensitivity can be stabilized.

Similarly, as shown in FIG. 4, the wavelength to be $\Delta\lambda=0$ gives a local minimum value, which becomes an optimum operation point of phase control of the MZ-type 1-bit delay unit 2 with respect to an input optical signal. Specifically, regarding the optical signal output from the output port 6, the minimum value control of the optical output characteristics with respect to a wavelength shift is performed, whereby the reception sensitivity can be stabilized.

Note that as a process for the maximum value control or the minimum value control of the optical output characteristics, a control algorithm such as a hill-climbing method can be used. Further, in a case of controlling the stabilization of reception sensitivity at a high speed, for example, a control algorithm such as a gradient method or an optimum solution search method based on a linear search method can be used.

As described above, according to the optical reception device according to Embodiment 1, the stabilization is controlled based on the output from the photoelectric conversion means (e.g., PD), so the reception sensitivity can be stabilized at low cost with high precision.

Embodiment 2

Figure 5:
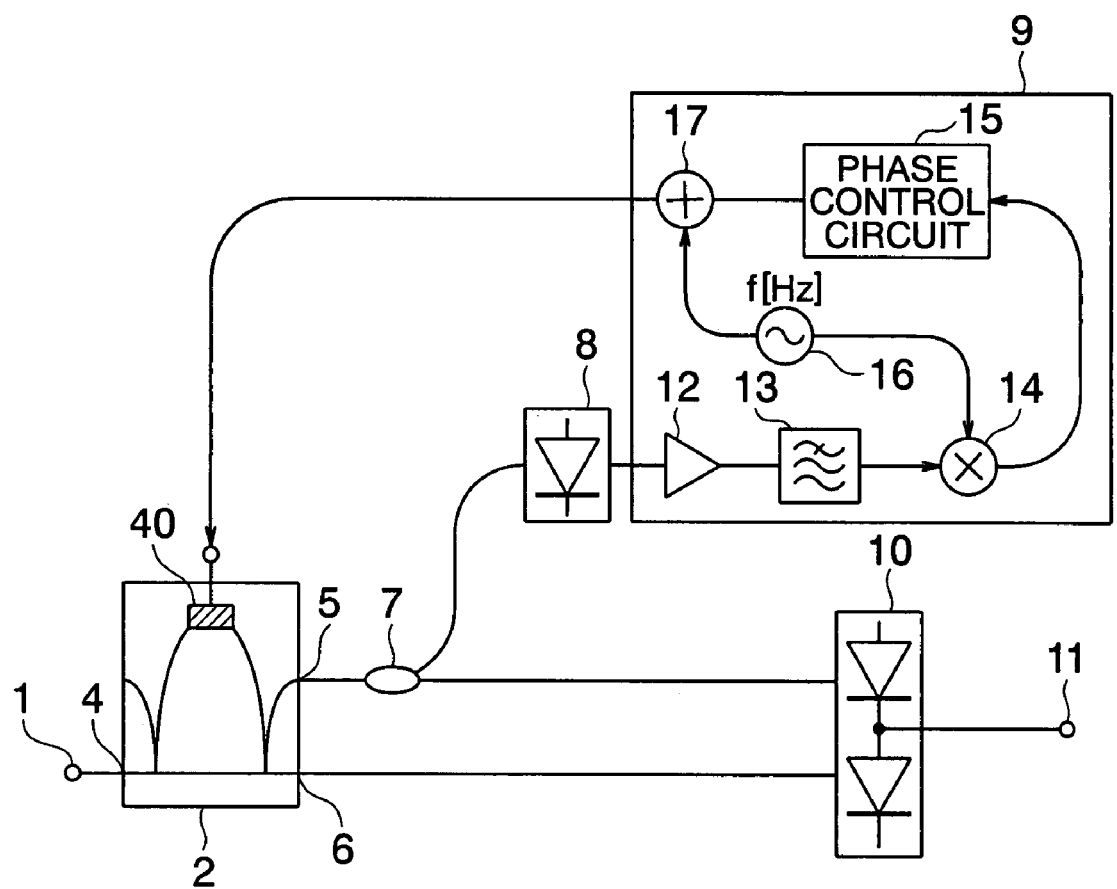
FIG. 5 is a block diagram showing a configuration of an optical reception device according to Embodiment 2 of the present invention.

FIG. 5 is a block diagram showing a configuration of an optical reception device according to Embodiment 2 of the present invention. In the optical reception device shown in the figure, the configuration of a phase control unit 9 is shown in detail. Specifically, the phase control unit 9 shown in the figure is configured so as to include a preamplifier 12 that receives an optical output of the PD 8, a low-pass filter (LPF) 13 for blocking a high-frequency component of an output of the preamplifier 12, a dither signal source 16 that generates a dither signal, a mixer 14 serving as phase comparison means that receives the dither signal and the output signal of the LPF 13, and outputs as an error signal a phase comparison signal obtained by comparing phases between these output signals, a phase control circuit 15 that outputs a DC voltage based on the output signal (error signal) of the mixer 14, and an adder 17 that superimposes the dither signal on the DC voltage. The remaining configuration is the same as that of Embodiment 1, and these components are denoted by the same reference numerals as those thereof.

Next, the operation of the optical reception device shown in FIG. 5 will be described. Herein, the processing different from that of Embodiment 1 will be mainly described, and the description of the common processing will be omitted.

In FIG. 5, the dither signal with a low frequency f [Hz] generated by the dither signal source 16 is applied to the phase control function 40 of the MZ-type 1-bit delay unit 2 via the adder 17. As a result, the dither signal is super imposed on optical signals output from the output ports 5 and 6. The low frequency indicates that a frequency is lower than that in an RF band, and the use of expensive RF equipment can be excluded by using a signal with such a low frequency. Further, the dither signal is not required to be a sine wave with a single frequency, and may contain a frequency component with a low frequency f[Hz].

The dither signal superimposed on the optical signal is converted into an electric signal by the PD 8 via the optical coupler 7 as light intensity information. The dither signal converted into an electric signal is amplified to a desired level by the preamplifier 12, passes through a low-pass filter 13 (hereinafter, abbreviated as "LPF") having a cut-off frequency of, for example, f[Hz], and is then output to one input terminal of the mixer 14. On the other hand, the other input terminal of the mixer 14 receives a dither signal generated by the dither signal source 16. In the mixer 14 having received these signals, a phase comparison signal representing a phase comparison result between the original dither signal and the dither signal after the photoelectric conversion is output as an error signal. In the phase control circuit 15, a phase control signal based on the error signal is generated and output to the adder 17. The phase control signal is superimposed on the dither signal in the adder 17, and the phase of the MZ-type 1-bit delay unit 2 is controlled based on the phase control signal superimposed with the dither signal.

Figure 6:
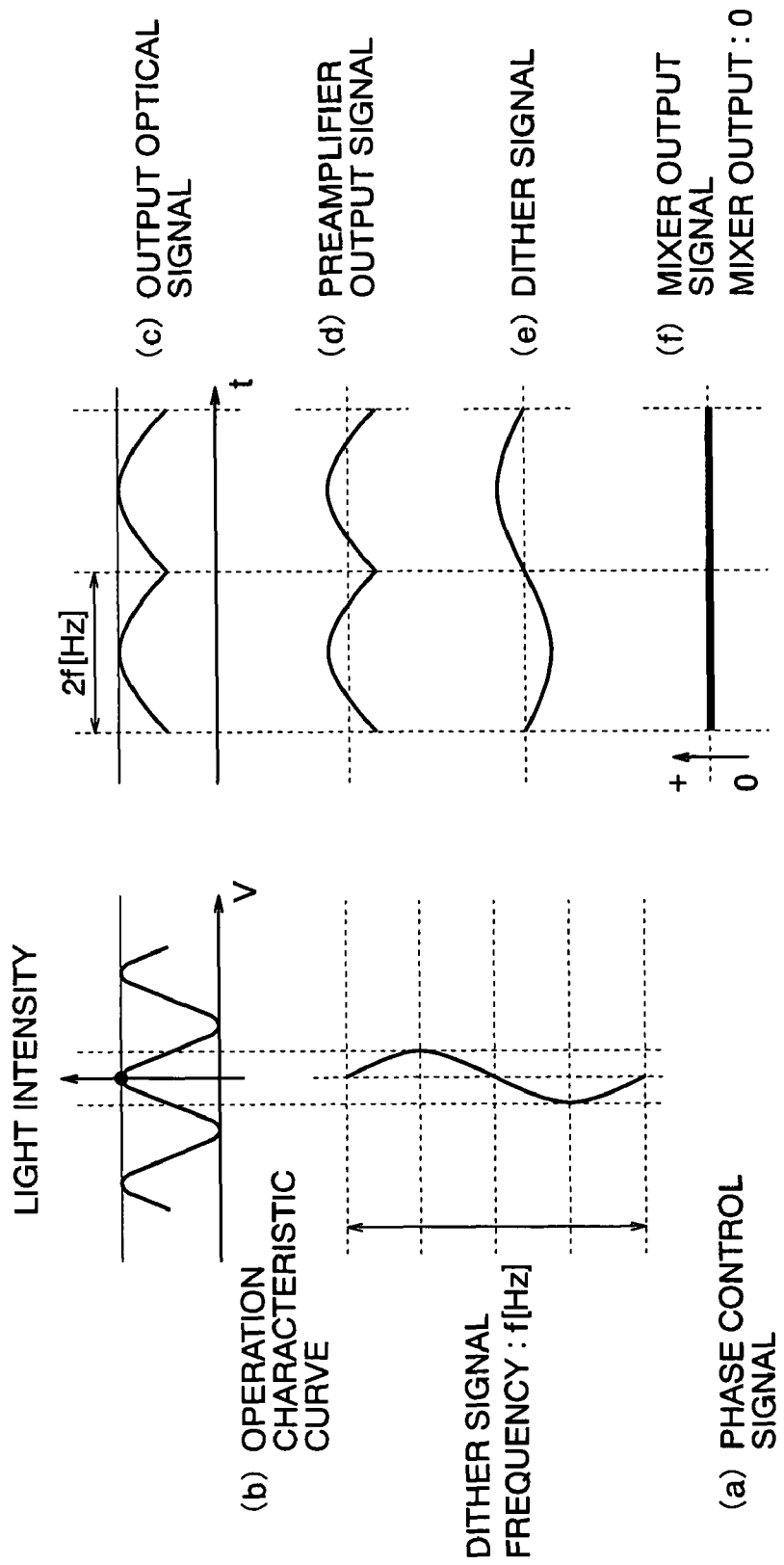
FIG. 6 is a waveform diagram for explaining an operation at an optimum point in the optical reception device according to Embodiment 2 of the present invention.
Figure 7:
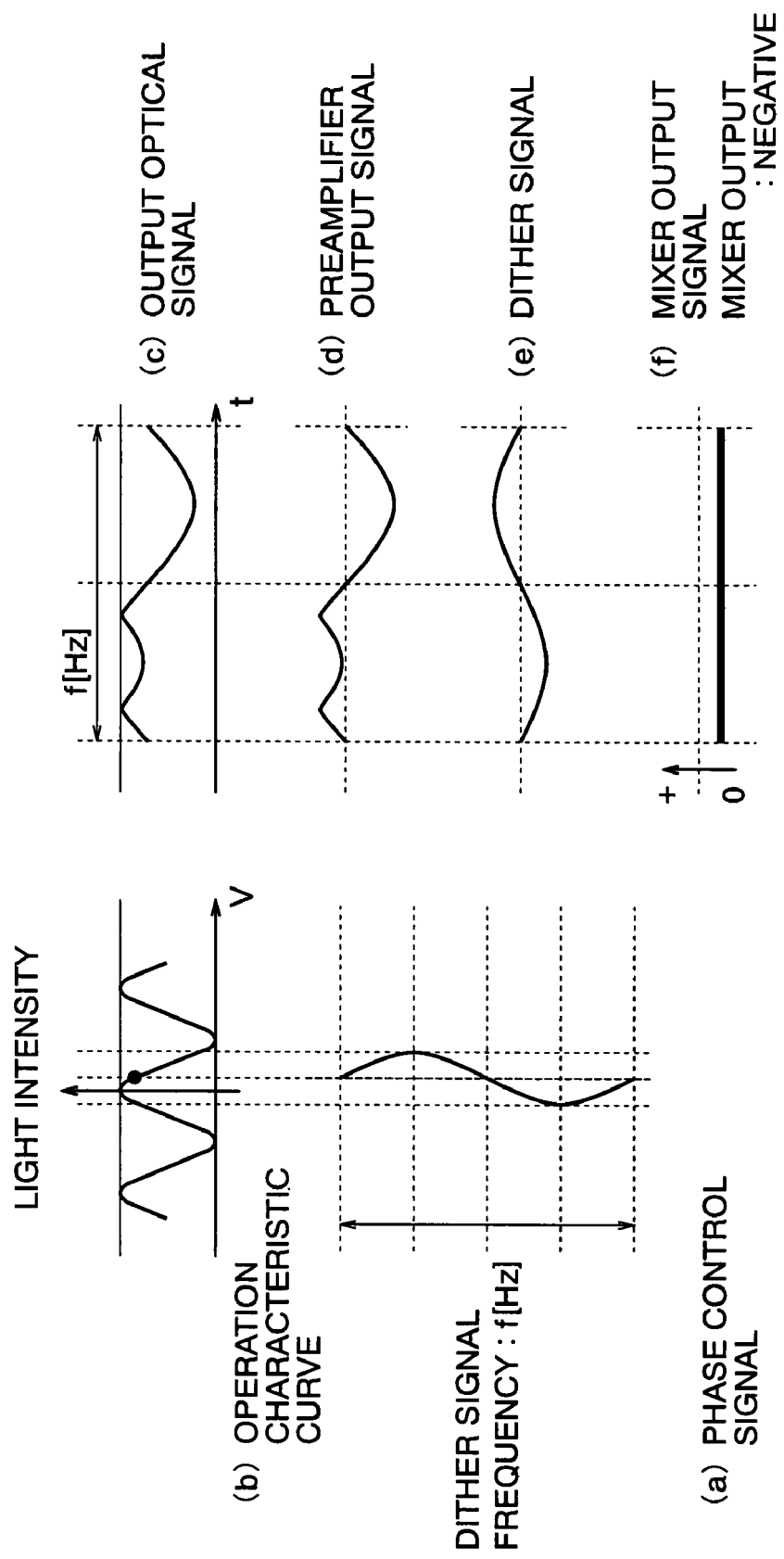
FIG. 7 is a waveform diagram for explaining an operation when an operation point shifts from an optimum value to a long wavelength side in the optical reception device according to Embodiment 2 of the present invention.
Figure 8:
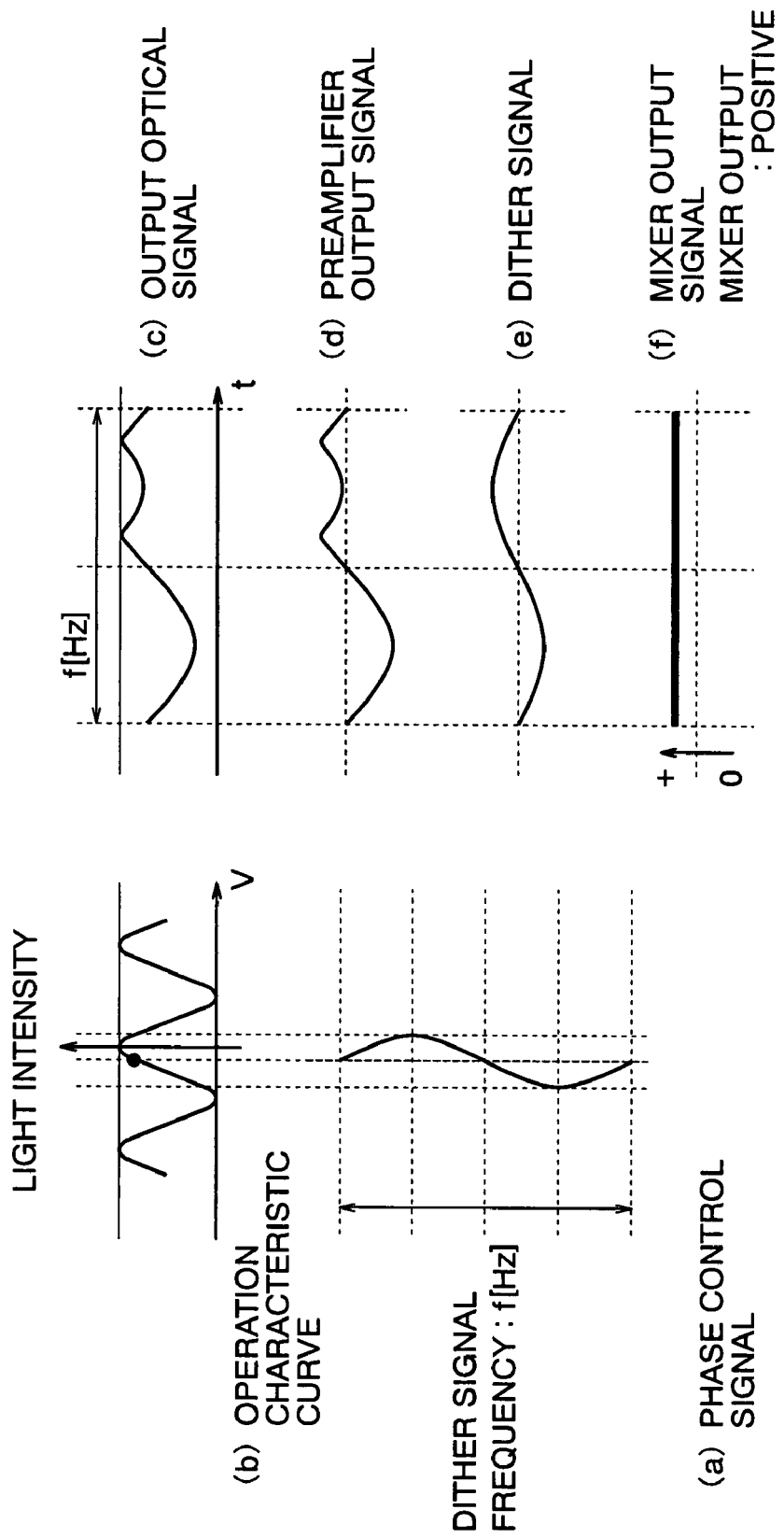
FIG. 8 is a waveform diagram for explaining an operation when an operation point shifts from an optimum value to a short wavelength side in the optical reception device according to Embodiment 2 of the present invention.

Next, the operation of the optical reception device shown in FIG. 5 will be described with reference to FIGS. 6 to 8. FIG. 6 is a waveform diagram for explaining the operation at an optimum point in the optical reception device shown in FIG. 5; FIG. 7 is a waveform diagram for explaining an operation when an operation point shifts from an optimum value to a long wavelength side in the optical reception device shown in FIG. 5; and FIG. 8 is a waveform diagram for explaining an operation when an operation point shifts from an optimum value to a short wavelength side in the optical reception device shown in FIG. 5.

FIG. 6 shows the operation of the MZ-type 1-bit delay unit 2 at an optimum point. A phase control signal shown in (a) of the figure represents an output signal of the adder 17 which is applied to the phase control function 40 of the MZ-type 1-bit delay unit 2. A dither signal with a low frequency f[Hz] generated by the dither signal source 16 is superimposed on the phase control signal that is an output of the phase control circuit 15 via the adder 17.

The operation characteristic curve shown in (b) of the figure represents optical output characteristics of the output port 5 (constructive port) of the MZ-type 1-bit delay unit 2. As represented by the operation characteristic curve, an optical output varies periodically with respect to a voltage applied to the phase control function 40. An operation point represented by a symbol "●" is an optimum operation point that can give a maximum value of light intensity. Thus, in a case where a voltage containing a dither signal is applied, the output optical signal of the output port 5 (constructive port) of the MZ-type 1-bit delay unit 2 contains a frequency component of 2 f[Hz] as shown in (c) of the figure, and the output signal from the preamplifier 12 has a waveform as shown in (d) of the figure.

The output signal of the preamplifier 12 and the dither signal shown in (e) of the figure output from the dither signal source 16 are subjected to synchronous detection in the mixer 14, and the output signal of the mixer 14 output at this time has a DC voltage at a zero level as shown in (f) of the figure.

FIG. 7 shows the operation of the MZ-type 1-bit delay unit 2 when a voltage applied to the phase control function 40 shifts from an optimum value to a long wavelength side. The phase control signal shown in (a) of the figure represents an output signal of the adder 17 applied to the phase control function 40 of the MZ-type 1-bit delay unit 2. The dither signal with a low frequency f[Hz] generated by the dither signal source 16 is superimposed on a control signal that is an output of the phase control circuit 15 through the adder 17.

The operation characteristic curve shown in (b) of the figure represents optical output characteristics of the output port 5 (constructive port) of the MZ-type 1-bit delay unit 2. As represented by the operation characteristic curve, the voltage applied to the phase control function 40 shifts from the optimum value to the long wavelength side. As a result, the output optical signal of the output port 5 (constructive port) of the MZ-type 1-bit delay unit 2 contains a frequency component of f[Hz] as shown in (c) of the figure, and the output signal of the preamplifier 12 has a waveform as shown in (d) of the figure.

The output signal of the preamplifier 12 and the dither signal shown in (e) of the figure output from the dither signal source 16 are subjected to synchronous detection in the mixer 14, and the output signal of the mixer 14 output at this time becomes a negative DC voltage as shown in (f) of the figure.

FIG. 8 shows the operation of the MZ-type 1-bit delay unit 2 when the voltage applied to the phase control function 40 shifts from an optimum value to a short wavelength side. (a) of the figure shows an output signal of the adder 17 applied to the phase control function 40 of the MZ-type 1-bit delay unit 2. The dither signal with a low frequency f[Hz] generated by the dither signal source 16 is superimposed on a control signal that is an output of the phase control circuit 15 through the adder 17.

The operation characteristic curve shown in (b) of the figure represents optical output characteristics of the output port 5 (constructive port) of the MZ-type 1-bit delay unit 2. As represented by the operation characteristic curve, the voltage applied to the phase control function 40 shifts from an optimum value to a short wavelength side. As a result, the output optical signal of the output port 5 (constructive port) of the MZ-type 1-bit delay unit 2 contains a frequency component of f[Hz] that is different in phase by a half circumference from the waveform of (c) of the figure, and the output electric signal of the preamplifier 12 has a waveform as shown in (d) of the figure.

The output signal of the preamplifier 12 and the dither signal output from the dither signal source 16 are subjected to synchronous detection in the mixer 14, and the output signal of the mixer 14 output at this time has a positive DC voltage as shown in (f) of the figure.

Thus, the mixer 14 outputs an error signal of the DC voltage corresponding to the shift from the optimum value of the voltage applied to the phase control function 40 of the MZ-type 1-bit delay unit 2. Accordingly, the phase control circuit 15 controls the phase control function 40 of the MZ-type 1-bit delay unit 2 so that an error signal output to the phase control circuit 15 becomes zero, whereby the stabilization of the reception sensitivity can be realized.

Further, if a low-pass filter limiting the large range is provided in the phase control circuit 15, an excess high-frequency component contained in the output of the mixer 14 can be suppressed.

Further, the optical coupler 7 shown in FIG. 5 may be placed in the output port 6 (destructive port) of the MZ-type 1-bit delay unit 2. In this case, when the voltage applied to the phase control function 40 of the MZ-type 1-bit delay unit 2 shifts from an optimum value to a long wavelength side, a positive error signal is obtained, and when the voltage applied to the phase control function 40 of the MZ-type 1-bit delay unit 2 shifts from an optimum value to a short wavelength side, a negative error signal is obtained, so the control opposite to that described above may be performed.

As described above, according to the optical reception device according to Embodiment 2, the stabilization control is performed using a dither signal at low speed, in addition to the output of the photoelectric conversion means (e.g., PD). Therefore, the reception sensitivity can be stabilized at low cost with high precision.

Embodiment 3

Figure 9:
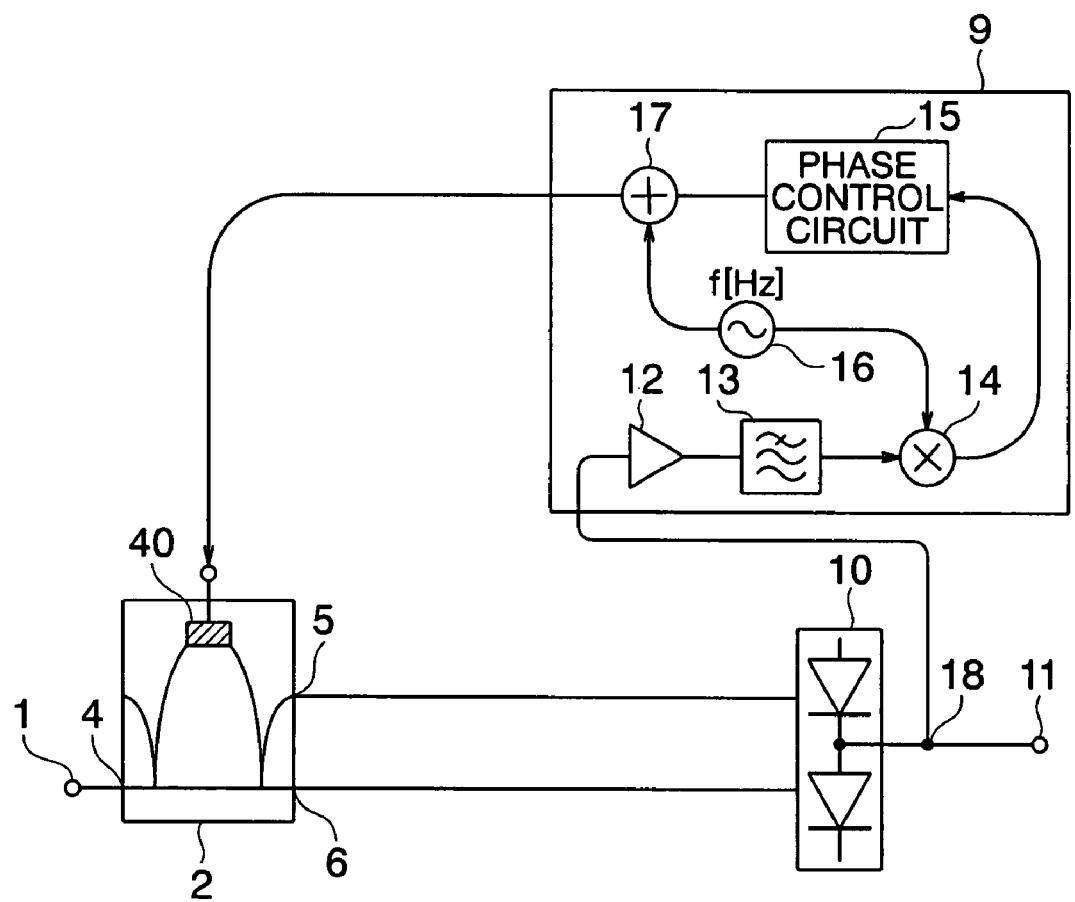
FIG. 9 is a block diagram showing a configuration of an optical reception device according to Embodiment 3 of the present invention.

FIG. 9 is a block diagram showing a configuration of an optical reception device according to Embodiment 3 of the present invention. In Embodiment 2, the dither signal to the preamplifier 12 is output from any output port of the MZ-type 1-bit delay unit 2 via the optical coupler 7. However, Embodiment 3 is different from Embodiment 2 in that the dither signal is output from the balanced receiver 10. The remaining configuration is the same or equivalent to those of Embodiments 1 and 2, and the components thereof are denoted by the same reference numerals as those thereof.

Next, the operation of the optical reception device shown in FIG. 9 will be described. In the figure, the dither signal with a low frequency f[Hz] generated by the dither signal source 16 is applied to the phase control function 40 of the MZ-type 1-bit delay unit 2 via the adder 17. As a result, the dither signal is superimposed on optical signals output from the output ports 5 and 6.

The dither signal superimposed on the optical signal is converted into an electric signal by the balanced receiver 10 as light intensity information. The reception sensitivity of the dither signal converted into an electric signal is enhanced by 3 dB in a similar manner to that of a DPSK signal by the differential reception of the balanced receiver 10.

The dither signal converted into an electric signal is branched by the RF power branching unit 18, amplified to a desired level by the preamplifier 12, passes through the LPF 13 having a cut-off frequency of f[Hz], for example, and is then output to one input terminal of the mixer 14. On the other hand, the dither signal generated by the dither signal source 16 is input to the other input terminal of the mixer 14. The mixer 14 that receives those signals outputs a phase comparison signal as an error signal, which represents a phase comparison result between the original dither signal and the optically/electrically converted dither signal. In the phase control circuit 15, the phase control signal based on the error signal is generated and output to the adder 17. The dither signal is superimposed on the phase control signal in the adder 17, and the phase control of the MZ-type 1-bit delay unit 2 is executed based on the phase control signal superimposed with the dither signal.

Figure 10:
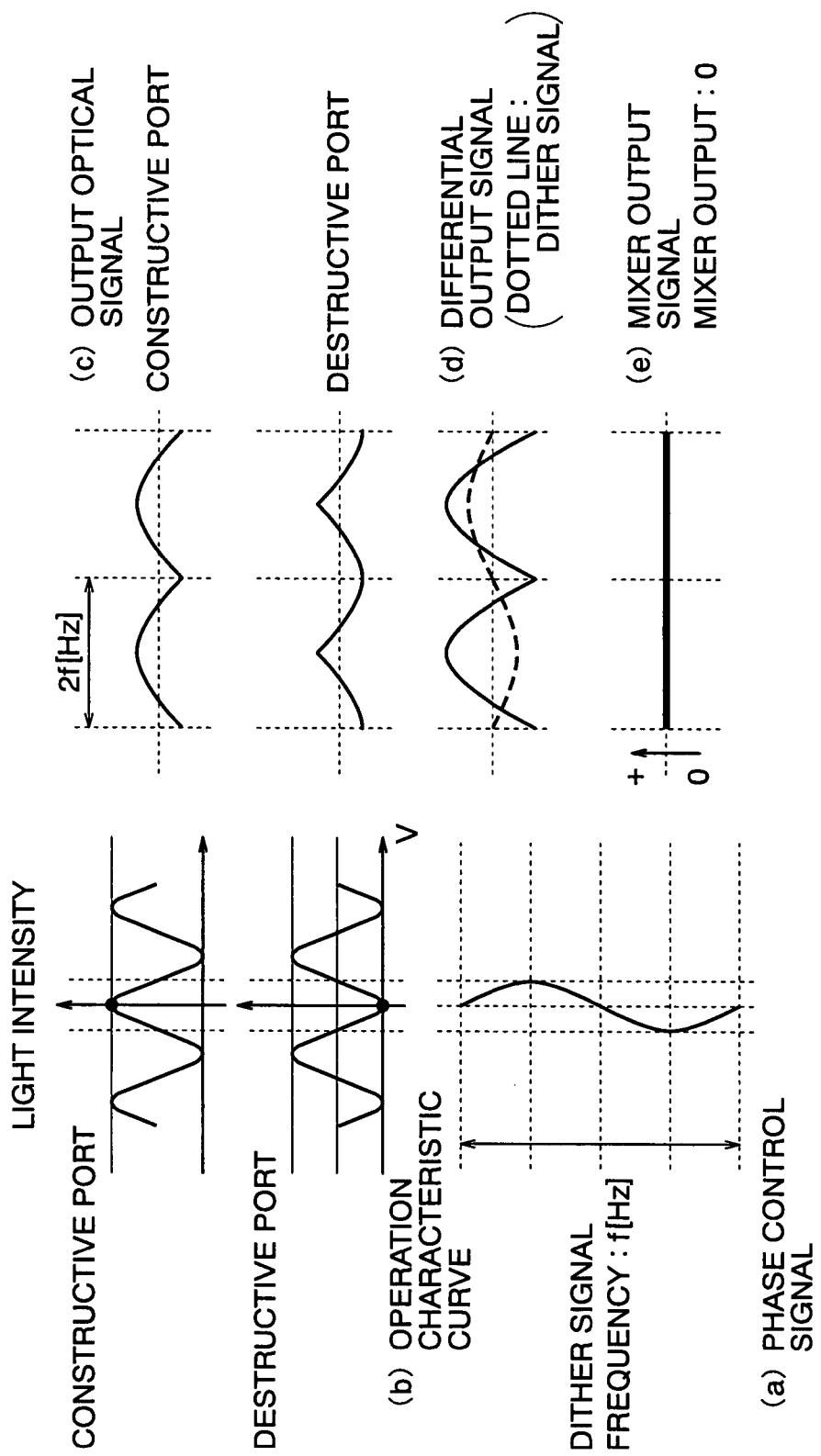
FIG. 10 is a waveform diagram for explaining an operation at an optimum point in the optical reception device according to Embodiment 3 of the present invention.
Figure 11:
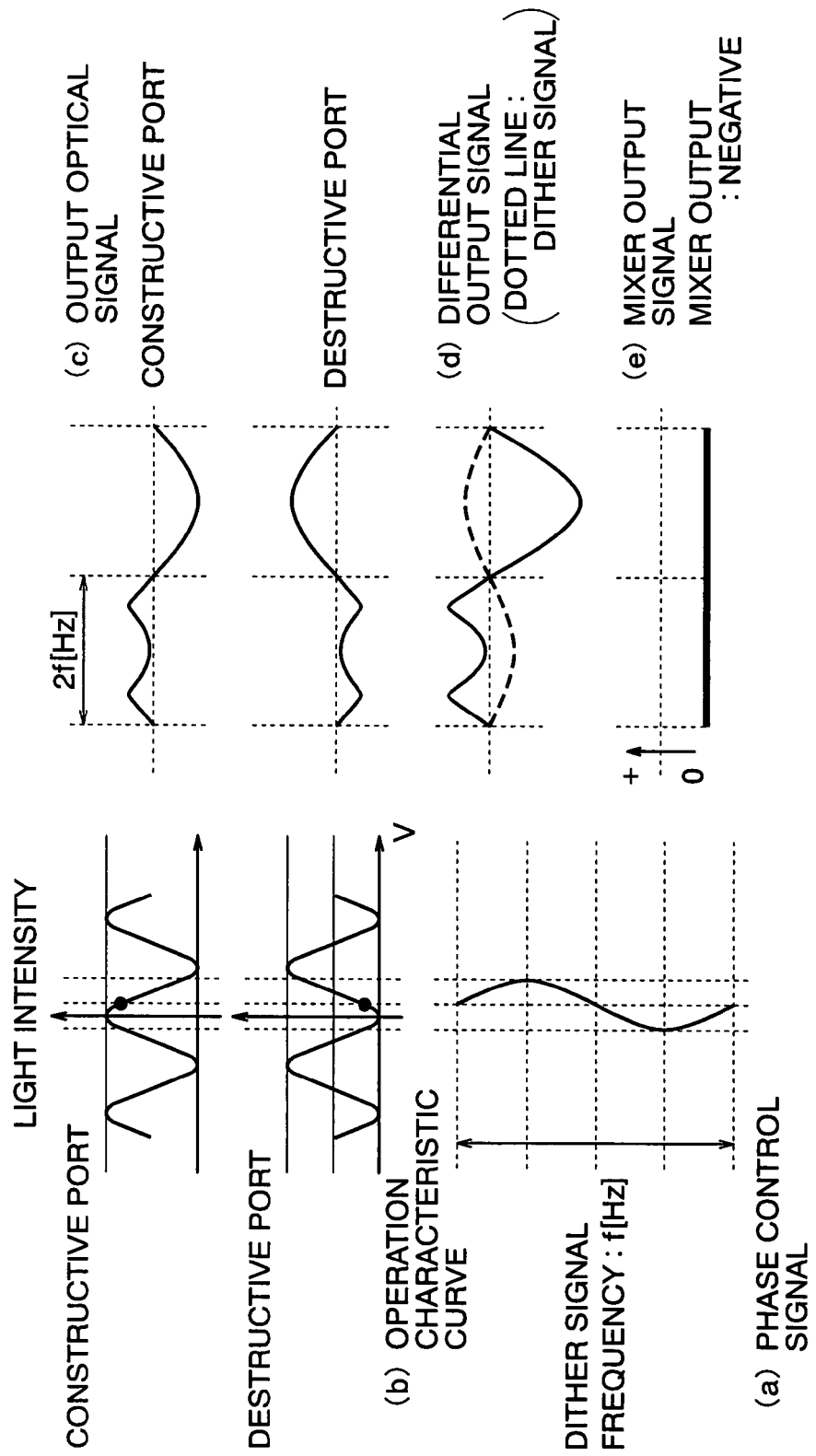
FIG. 11 is a waveform diagram for explaining an operation when an operation point shifts from an optimum value to a long wavelength side in the optical reception device according to Embodiment 3 of the present invention.
Figure 12:
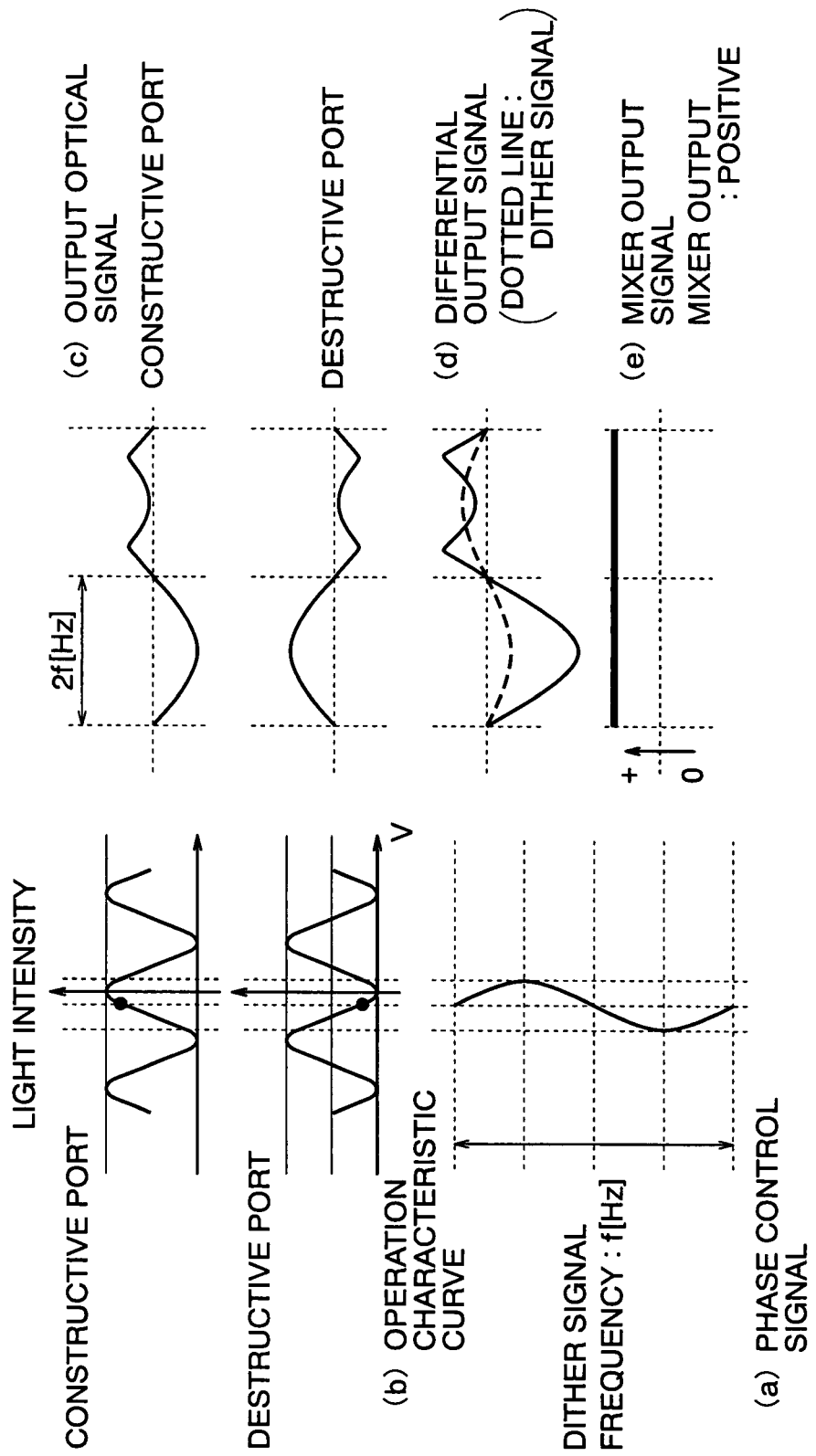
FIG. 12 is a waveform diagram for explaining an operation when an operation point shifts from an optimum value to a short wavelength side in the optical reception device according to Embodiment 3 of the present invention.

Next, the operation of the optical reception device shown in FIG. 9 will be described with reference to FIGS. 10 to 12. FIG. 10 is a waveform diagram for explaining the operation at an optimum point in the optical reception device shown in FIG. 9; FIG. 11 is a waveform diagram for explaining the operation when the operation point shifts from an optimum value to a long wavelength side in the optical reception device shown in FIG. 9; and FIG. 12 is a waveform diagram for explaining the operation when the operation point shifts from an optimum value to a short wavelength side in the optical reception device shown in FIG. 9.

FIG. 10 shows the operation of the MZ-type 1-bit delay unit 2 at an optimum point. The phase control signal shown in (a) of the figure represents an output signal of the adder 17 which is added to the phase control function 40 of the MZ-type 1-bit delay unit 2. The dither signal with a low frequency f[Hz] generated by the dither signal source 16 is superimposed on the phase control signal that is an output of the phase control circuit 15 via the adder 17.

The operation characteristics curve shown in (b) of the figure represents optical output characteristics of the output port 5 (constructive port) of the MZ-type 1-bit delay unit 2 and the output port 6 (destructive port) thereof. According to these operation characteristics, an optical output changes reciprocally and periodically with respect to a voltage applied to the phase control function 40, and each optical output becomes a maximum output (output port 5) and a minimum output (output port 6) at each optimum point represented by a symbol "●" of (b) of the figure. Thus, in the case where a voltage containing a dither signal is applied, the respective output optical signals of the output ports 5 and 6 of the MZ-type 1-bit delay unit 2 contain a frequency component of 2 f[Hz] with phases inverted from each other as shown in (c) of the figure, and the output signal of the preamplifier 12 obtained after the differential reception forms a waveform as shown in (d) of the figure.

The output signal of the preamplifier 12 and the dither signal shown in (e) of the figure output from the dither signal source 16 are subjected to synchronous detection in the mixer 14, and the output signal of the mixer 14 output at this time becomes a DC voltage at a zero level as shown in (f) of the figure.

FIGS. 11 and 12 each show waveforms representing the respective operations in the case where the voltage applied to the phase control function 40 shifts from an optimum value to a long wavelength side, or in the case where the voltage applied to the phase control function 40 shifts from an optimum value to a short wavelength side. The basic operations are the same as those of FIGS. 7 and 8, except that the differential output signals obtained in FIGS. 11(*d*) and 12(*d*) have amplitudes twice those of FIGS. 7(*d*) and 8(*d*).

Thus, the mixer 14 outputs an error signal of a DC voltage corresponding to a shift from an optimum value of the voltage applied to the phase control function 40 of the MZ-type 1-bit delay unit 2. Thus, the phase control circuit 15 controls the phase control function 40 of the MZ-type 1-bit delay unit 2 so that the error signal output to the phase control circuit 15 becomes zero, whereby the reception sensitivity can be stabilized. Further, since the differential output signal is an electric signal having a two-fold amplitude, the effect of expecting the enhancement of the ability of detecting an error of 3 dB as compared with Embodiment 2, can be obtained.

As described above, according to the optical reception device according to Embodiment 3, in the same manner as in Embodiment 2, the stabilization is controlled using a dither signal with a low frequency, so the stabilization of reception sensitivity can be realized at low cost, and a dither signal is detected after the differential reception. Thus, the stabilization of reception sensitivity can be realized with higher precision.

Embodiment 4

Figure 13:
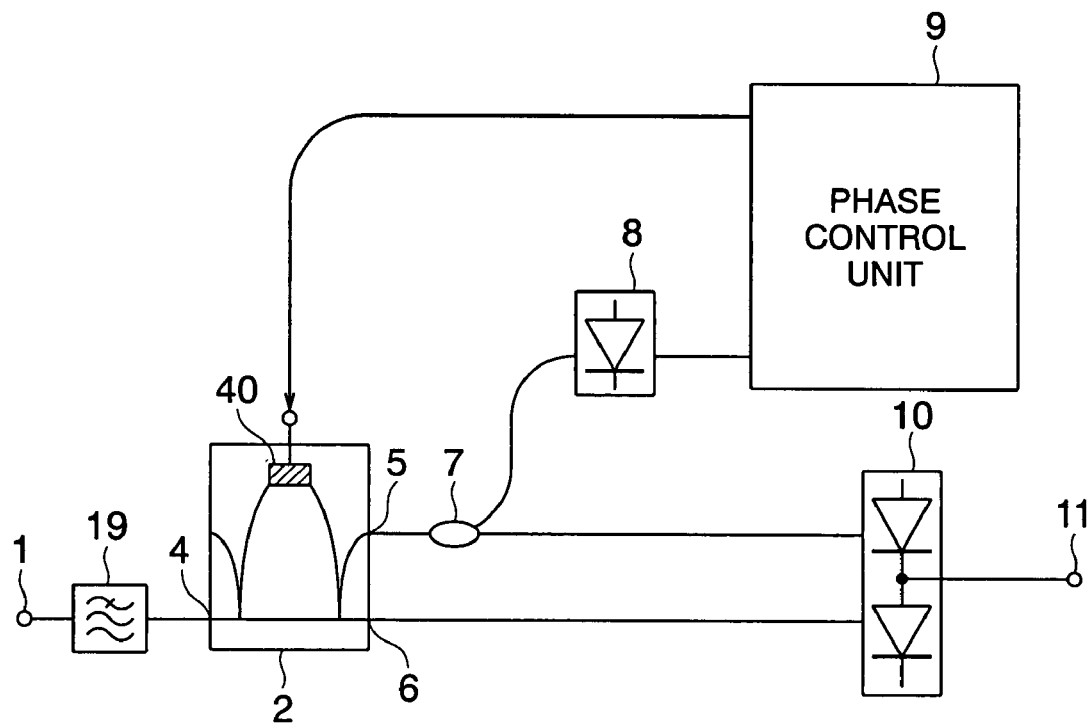
FIG. 13 is a block diagram showing a configuration of an optical reception device according to Embodiment 4 of the present invention.

FIG. 13 is a block diagram showing a configuration of an optical reception device according to Embodiment 4 of the present invention. The optical reception device shown in the figure is configured so as to include an optical filter 19 which is inserted between the optical input signal terminal 1 and the MZ-type 1-bit delay unit 2, in addition to the configuration of Embodiment 1. The remaining configuration is the same or equivalent to that of Embodiment 1, and the components thereof are denoted by the same reference numerals as those thereof.

The optical filter 19 has a band of about 0.8 to 2 times that of a free spectrum range of the MZ-type 1-bit delay unit 2. Thus, in the optical reception device of Embodiment 4, an unwanted noise component is reduced by the optical filter 19, and the band width corresponding to the free spectrum range of the MZ-type 1-bit delay unit 2 is selected, whereby the ability of detecting an error after optical/electrical signal conversion can be enhanced, and the precision of the stabilization of reception sensitivity can be increased.

Figure 14:
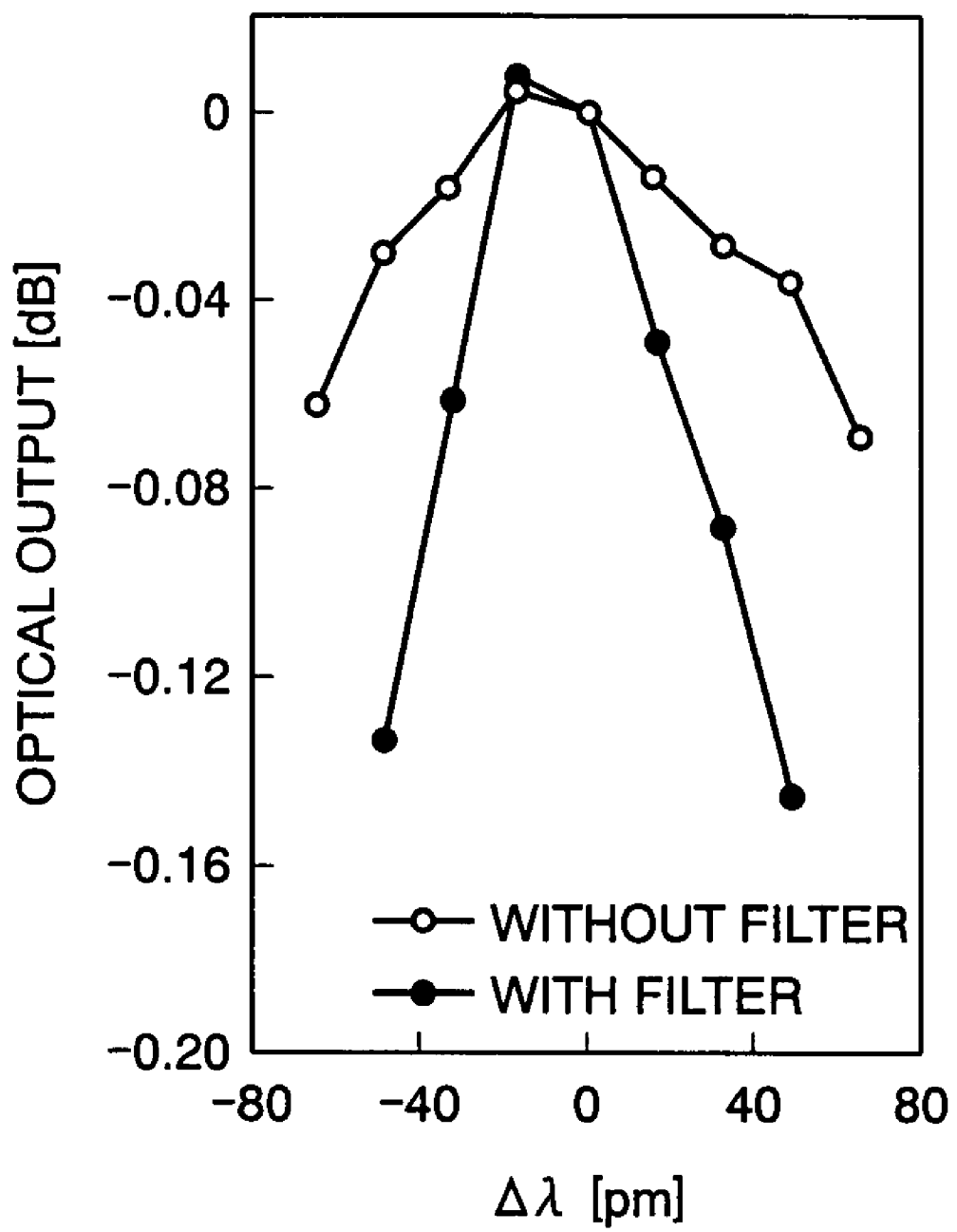
FIG. 14 shows optical output characteristics of an output port 5 with respect to a wavelength shift of an input optical signal under the condition that an optical signal vs. noise ratio of an input optical signal is unsatisfactory in an MZ-type 1-bit delay unit of the optical reception device according to Embodiment 4 of the present invention.
Figure 15:
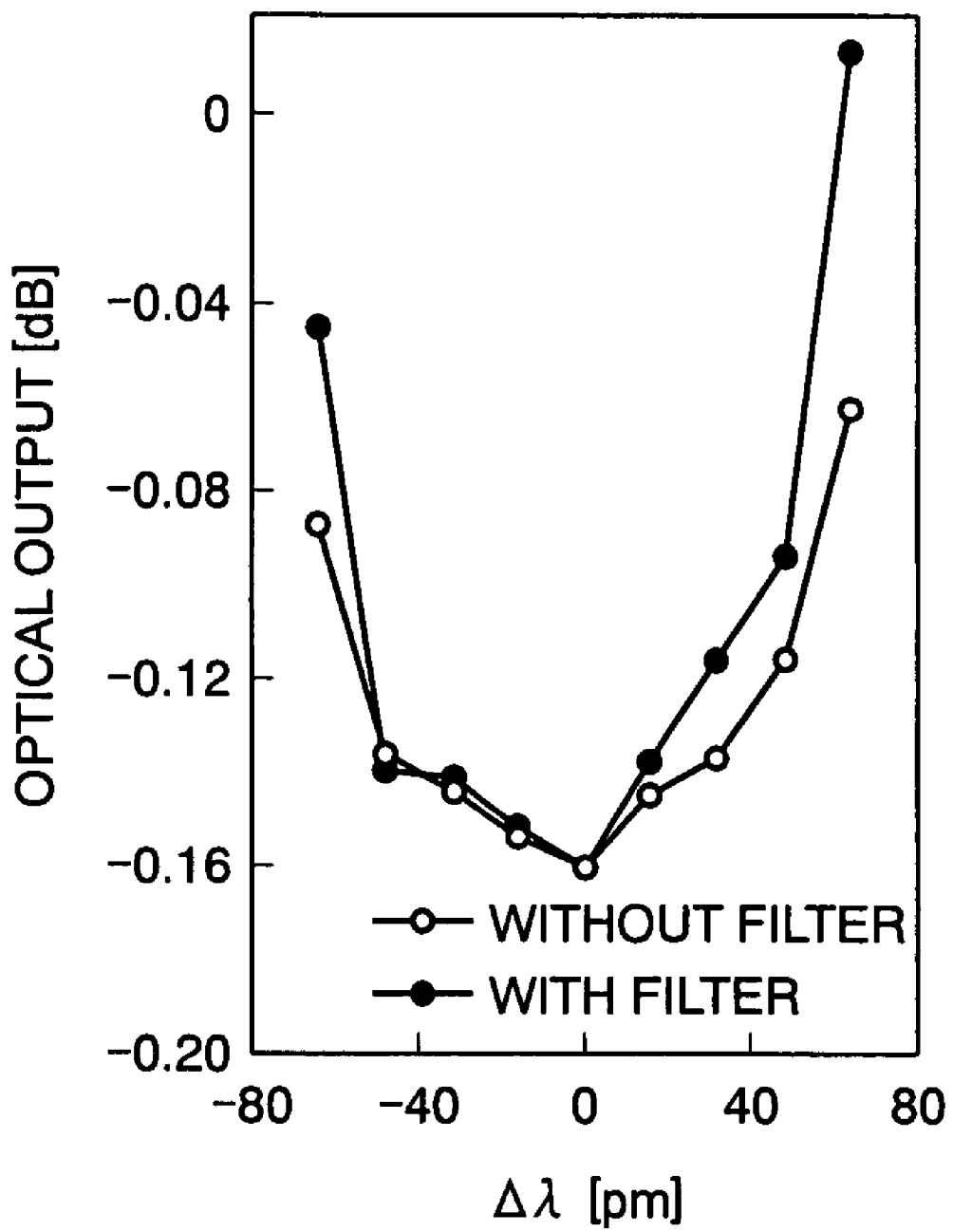
FIG. 15 is a diagram showing optical output characteristics of the output port 6 under the condition that an optical signal vs. noise ratio of an input optical signal in the MZ-type 1-bit delay unit of the optical reception device according to Embodiment 4 of the present invention.

Further, FIG. 14 is a diagram showing optical output characteristics of the output port 5 with respect to a wavelength shift of an input optical signal under the condition that an optical signal vs. noise ratio of the input optical signal is unsatisfactory in the MZ-type 1-bit delay unit 2 shown in FIG. 13. FIG. 15 is a diagram showing optical output characteristics of the output port 6 under the condition.

Next, the enhancement of the ability of detecting an error signal by using the optical filter 19 in the optical reception device shown in FIG. 13 will be described with reference to FIGS. 14 and 15.

In FIG. 14, a curve represented by a symbol "○" of the figure shows an optical output of the output port 5 of the MZ-type 1-bit delay unit 2 when the optical filter is not used, and a symbol "●" of the figure shows an optical output when the optical filter 19 having a band twice that of a free spectrum range of the MZ-type 1-bit delay unit 2 is used.

Further, $\Delta\lambda=0$ of FIG. 14 corresponds to an optimum operation point of the phase of the MZ-type 1-bit delay unit 2 with respect to the input optical signal. As represented by the waveform of the figure, it can be understood that the change ratio of an optical output with respect to a shift from an optimum operation point where $\Delta\lambda=0$ is enhanced. For this reason, the ability of detecting an error after optical/electrical signal conversion can be enhanced and the precision of the stabilization of reception sensitivity can be increased by using the optical filter 19.

Further, even in the optical output characteristics of the output port 6 shown in FIG. 15, the point where $\Delta\lambda=0$ becomes an optimum operation point that gives a local minimum value, and the change in an optical output can be enhanced with respect to the shift from the optimum operation point where $\Delta\lambda=0$ in the same way as in the output port 5.

As the optical filter 19, one having a band that is 0.8 times that of the free spectrum range of the MZ-type 1-bit delay unit 2 may be selected. In the case of using the optical filter 19 with such characteristics, the change ratio of an optical output can be further increased with respect to the shift from the optimum operation point where $\Delta\lambda=0$, with hardly influencing the optical output characteristics in the vicinity of $\Delta\lambda=0$.

As described above, according to the optical reception device of Embodiment 4, the optical filter 19 having a band of about 0.8 to 2 times that of the free spectrum range of the 1-bit delay unit is used. Therefore, the reception sensitivity can be stabilized at low cost with high precision.

Note that Embodiment 4 is achieved by adding the optical filter 19, which is inserted between the optical input signal terminal 1 and the input port 4 of the MZ-type 1-bit delay unit 2, to the configuration of Embodiment 1. However, this configuration can also be added to the configurations of Embodiment 2 and 3, and Embodiment 5 described later. Even in these configurations, the same effects as those of Embodiment 4 can be obtained.

Embodiment 5

Figure 16:
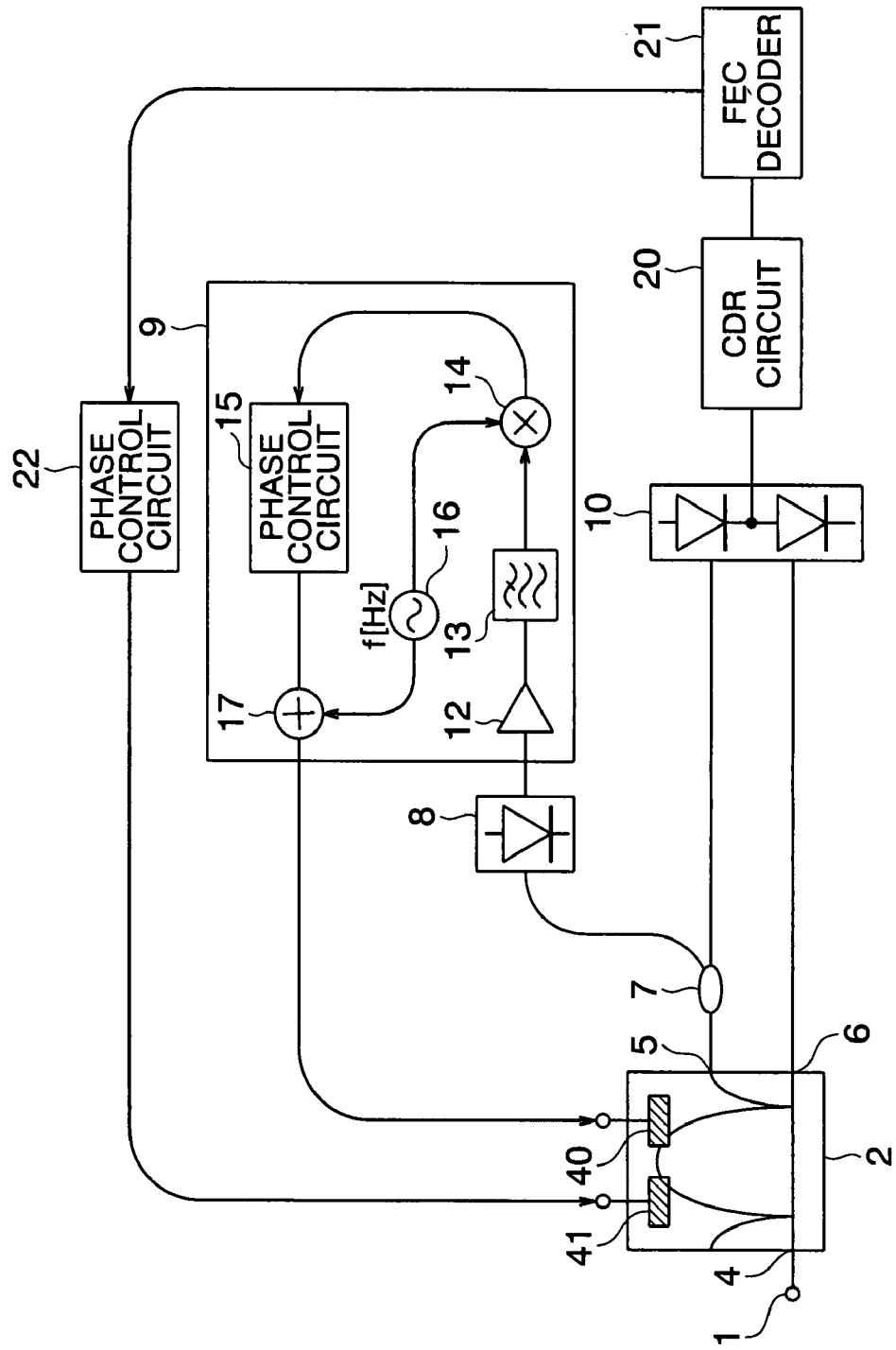
FIG. 16 is a block diagram showing a configuration of an optical reception device according to Embodiment 5 of the present invention.

FIG. 16 is a block diagram showing a configuration of an optical reception device according to Embodiment 5 of the present invention. In the optical reception device shown in the figure, in the configuration of Embodiment 2 shown in FIG. 5, a clock data recovery circuit (hereinafter, abbreviated as "CDR circuit") 20 that functions as error detection means and an FEC decoder 21 are added to a reception system, and a second phase control system including a phase control circuit 22 that generates and outputs a control signal for controlling the MZ-type 1-bit delay unit 2 based on the error detection results of the FEC decoder 21 is added to a control system, in addition to the first phase control system including the optical coupler 7, the PD 8, and the phase control unit 9 shown in FIG. 5. The remaining configuration is the same or equivalent to that of Embodiment 2, and the components thereof are denoted by the same reference numerals as those thereof.

Next, the operation of the optical reception device shown in FIG. 16 will be described. Herein, the processing different from that of Embodiment 2 will be mainly described, and the description of the common processing will be omitted.

In FIG. 16, the DPSK signal is converted into an electric signal at the balanced receiver 10. The converted electric signal is subjected to identification reproduction processing in the CDR circuit 20, and thereafter, subjected to error correction processing in the FEC decoder 21. At this time, an error signal based on the error correction information in the FEC decoder 21 is generated. The phase control circuit 22 controls the phase control function 41 of the MZ-type 1-bit delay unit 2 by using the error signal based on the error correction information.

Thus, the second phase control system according to Embodiment 5 uses error correction information of a main signal as an error signal, so the stabilization of the reception sensitivity can be realized with high precision.

Further, if the phase control of the MZ-type 1-bit delay unit 2 is performed using the first phase control system and the second phase control system as control loops of different time constants, both the phase control systems perform operations complementary to each other, so the stability of the control can be enhanced.

Further, by using the control in the first phase control system for coarse adjustment, and by using the control in the second phase control system for fine adjustment, both the stabilization of the control and the increase in speed of the control can be satisfied.

As described above, according to the optical reception device according to Embodiment 5, the stabilization control using a dither signal at a low speed in addition to the output of the photoelectric conversion means (e.g., PD) is performed, and the control using the error correction information of the reception system (DPSK receiver) is also performed. Therefore, the reception sensitivity can be stabilized at low cost with high precision, and the stabilization control of reception sensitivity can be performed at a high speed.

As described above, the present invention is useful as a reception device applicable to a high-speed optical transmission system, and in particular, preferable in a case where it is desired to realize the stabilization of reception sensitivity easily or the like.

The invention claimed is:

1. An optical reception device, comprising:
a Mach-Zehnder type 1-bit delay unit having one or a plurality of phase control functions of controlling a phase state of light, the Mach-Zehnder type 1-bit delay unit having first and second optical output ports;
photoelectric conversion means for branching a part of an optical output signal output from the first optical output port of the Mach-Zehnder type 1-bit delay unit and converting it into an electric signal;
a phase control unit that produces a phase control signal on the basis of the electric signal output from the photoelectric conversion means, the phase control unit comprising:

phase comparison means for comparing phases of a component of the electric signal output from the photoelectric conversion means and a dither signal, and generating an error signal representing the result of the comparison,
a phase control circuit that converts the error signal from the phase comparison means into a DC voltage, and
an adder that produces the phase control signal by superimposing the dither signal onto the DC voltage, the phase control signal being sent to the Mach-Zehnder type 1-bit delay unit to control a phase state of the Mach-Zehnder type 1-bit delay unit; and
a balanced receiver that differentially receives the optical output signals from the first and second output ports, and produces therefrom an electric output signal.

2. An optical reception device according to claim 1, wherein the phase control unit further comprises:
a dither signal source from which the dither signal is sent to the phase comparison means and the adder; and
a low pass filter for passing a low frequency component of the electric signal output from the photoelectric conversion means before the electrical signal is sent to the phase comparison means;
wherein the phase state of the Mach-Zehnder type 1-bit delay unit is controlled based on an output signal from the adder.

3. An optical reception device according to claim 2, wherein a DC voltage is output as the error signal output from the phase comparison means.

4. An optical reception device according to claim 2, wherein the dither signal contains a low-frequency signal component that has a low frequency as compared with a frequency in an RF band.

5. An optical reception device according to claim 2, wherein a cut-off frequency of the low-pass filter is set to be a frequency of a low-frequency signal component contained in the dither signal.

6. An optical reception device, comprising:
a Mach-Zehnder type 1-bit delay unit having one or a plurality of phase control functions of controlling a phase state of light;
photoelectric conversion means for branching a part of an optical output signal output from the first optical output port of the Mach-Zehnder type 1-bit delay unit and converting it into an electric signal;
a phase control unit that produces a first phase control signal, the first phase control signal being sent to the Mach-Zehnder type 1-bit delay unit to control a phase state of the Mach-Zehnder type 1-bit delay unit, the first phase control signal being produced on the basis of the electric signal output from the photoelectric conversion means, the phase control unit comprising:
a dither signal source that generates a dither signal,
a low-pass filter for passing a low-frequency component of the electric signal output from the photoelectric conversion means,
phase comparison means for comparing phases of the low-frequency component of the electric signal passed from the low-pass filter and the dither signal generated by the dither signal source, and outputting as an error signal a phase comparison signal that represents the result of the phase comparison,
a first phase control circuit that converts the error signal output from the phase comparison means into a DC voltage, and an adder that produces the first phase control signal by superimposing the dither signal generated by the dither signal source onto the DC voltage;

a balanced receiver for differentially receiving an optical output signals output from the first and second output ports of the Mach-Zehnder type 1-bit delay unit, and produces therefrom an electric output signal;

error detection means for generating an error signal based on error correction information obtained when identification reproduction processing and error correction processing are performed with respect to a differential output of the balanced receiver; and a second phase control circuit for generating a second phase control signal for controlling the Mach-Zehnder type 1-bit delay unit based on an output of the error detection means, wherein the phase control unit controls a phase state of the Mach-Zehnder type 1-bit delay unit based on the first phase control signal from the adder, and wherein the second phase control circuit controls a phase state of the Mach-Zehnder type 1-bit delay unit based on the second phase control signal.

7. An optical reception device according to claim 1, further comprising an optical filter connected to a front stage of an input port of the Mach-Zehnder type 1-bit delay unit, and having a band of 0.8 to 2 times that of a free spectrum range of the Mach-Zehnder type 1-bit delay unit.

* * * * *